(12) United States Patent
Kajino et al.

(10) Patent No.: US 8,197,148 B2
(45) Date of Patent: Jun. 12, 2012

(54) WIRING TOOL AND MONITOR CAMERA DEVICE

(75) Inventors: Tetsurou Kajino, Tokyo (JP); Jouji Wada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 12/300,756

(22) PCT Filed: Jun. 7, 2007

(86) PCT No.: PCT/JP2007/061510
§ 371 (c)(1),
(2), (4) Date: Nov. 13, 2008

(87) PCT Pub. No.: WO2007/145126
PCT Pub. Date: Dec. 21, 2007

(65) Prior Publication Data
US 2009/0147084 A1 Jun. 11, 2009

(30) Foreign Application Priority Data
Jun. 13, 2006 (JP) ................................. 2006-163149

(51) Int. Cl.
*G03B 17/00* (2006.01)
*H01R 35/04* (2006.01)
(52) U.S. Cl. ........................................ 396/427; 439/534
(58) Field of Classification Search .................. 396/427; 348/143
See application file for complete search history.

(56) References Cited

U.S. PATENT DOCUMENTS

| 6,147,701 A * | 11/2000 | Tamura et al. ............... 348/36 |
| 6,268,882 B1 * | 7/2001 | Elberbaum ................... 348/151 |
| 6,544,069 B1 * | 4/2003 | Enriquez et al. ............. 439/534 |
| 8,120,895 B2 * | 2/2012 | Zeller et al. ............. 361/679.01 |
| 2006/0147194 A1 * | 7/2006 | Jones ........................... 396/427 |
| 2009/0147084 A1 * | 6/2009 | Kajino et al. ................ 348/143 |

FOREIGN PATENT DOCUMENTS

| JP | 07-162723 | 6/1995 |
| JP | 10-012337 | 1/1998 |
| JP | 10-135659 | 5/1998 |
| JP | 2001-024915 | 1/2001 |

OTHER PUBLICATIONS

International Search Report for PCT/JP2007/061510; completed Aug. 17, 2007.

* cited by examiner

*Primary Examiner* — W. B. Perkey
(74) *Attorney, Agent, or Firm* — Pearne & Gordon LLP

(57) ABSTRACT

The wiring fixture has a base unit, which is to be mounted on a predetermined position, and a functional unit that is formed as a removable structure and is to be electrically connected to the base unit. The base unit has a connecting body having a connecting section for connecting a first line from a control section of an electric device. The connecting body is rotatably disposed to the base unit so that the connecting section not only faces in a mounting direction of the base unit but also faces in a direction different from the mounting direction of the base unit. The structure copes with a layout change and offers easy wiring between the base unit and lines led through the ceiling or a wall.

16 Claims, 8 Drawing Sheets

# WIRING TOOL AND MONITOR CAMERA DEVICE

TECHNICAL FIELD

The present invention relates to a wiring fixture and a surveillance camera device in which a surveillance camera is fixed to the wiring fixture.

BACKGROUND ART

A conventional wiring fixture has a base unit, which is to be mounted on the ceiling or a wall, and a functional unit to be removably attached to the base unit. The base unit is mechanically and electrically connected to the functional unit. The base unit has a terminal block and a receptacle. The terminal block contains a terminal section for connecting a power line and a data transmission line that are led through a hole in the ceiling or a wall. The terminal block is fixed to a predetermined section of the base unit. On the other hand, the functional unit, on which a surveillance camera is mounted, has a plug to be met with the receptacle of the base unit when the two units have mechanical connection (see patent document 1, for example).

According to the aforementioned wiring fixture, after connecting each of the power line and the data transmission line led through a hole in the ceiling or a wall to the terminal block of the base unit and fixing the base unit to the ceiling or the wall, the functional unit is attached to the base unit. On completion of the mechanical connection of the two units, the receptacle of the base unit connects with the plug of the functional unit, which establishes electrical connections between the two units.

Such a conventional wiring fixture, however, has an inconvenience when a need for changing layout arises. For example, if the wiring fixture has to be moved from a current position on the ceiling to somewhere on the ceiling, the conventional structure allows connection work between the lines and the terminal section of the base unit to be done only at above the base unit, due to a fixed structure of the terminal block having the terminal section. Therefore, the connection sometimes needs an additional hole-drilling work in the ceiling for leading out the power line and the data transmission line from the rear side of the ceiling. Furthermore, when there is not enough space in the rear side of the ceiling that corresponds to a newly fixed position of the wiring fixture, workers often have difficulty in handling the lines in the limited space.

patent document 1: Japanese Unexamined Patent Application Publication No. H10-12337

SUMMARY OF THE INVENTION

The present invention addresses the conventional inconveniences above. It is therefore the object of the present invention to provide a wiring fixture and a surveillance camera device capable of easily coping with a layout change and offering easy wiring between the base unit and lines led through the ceiling and a wall.

The wiring fixture of the present invention has a base unit, which is to be mounted on a predetermined position, and a functional unit that is formed as a removable structure and is to be electrically connected to the base unit. The base unit has a connecting body having a connecting section for connecting a first line from a control section of an electric device. The connecting body is rotatably disposed to the base unit so that the connecting section not only faces in a mounting direction of the base unit but also faces in a direction different from the mounting direction of the base unit.

The structure above easily copes with a layout change, allowing the lines required for connection to be led through the hole as it has been used before the layout change, with no need for drilling an additional hole at a newly mounting position.

As described above, the present invention provides a wiring fixture and a surveillance camera device capable of offering easy wiring between the base unit and lines led through the ceiling and a wall, even if a need for changing layout arises.

Figure 1:
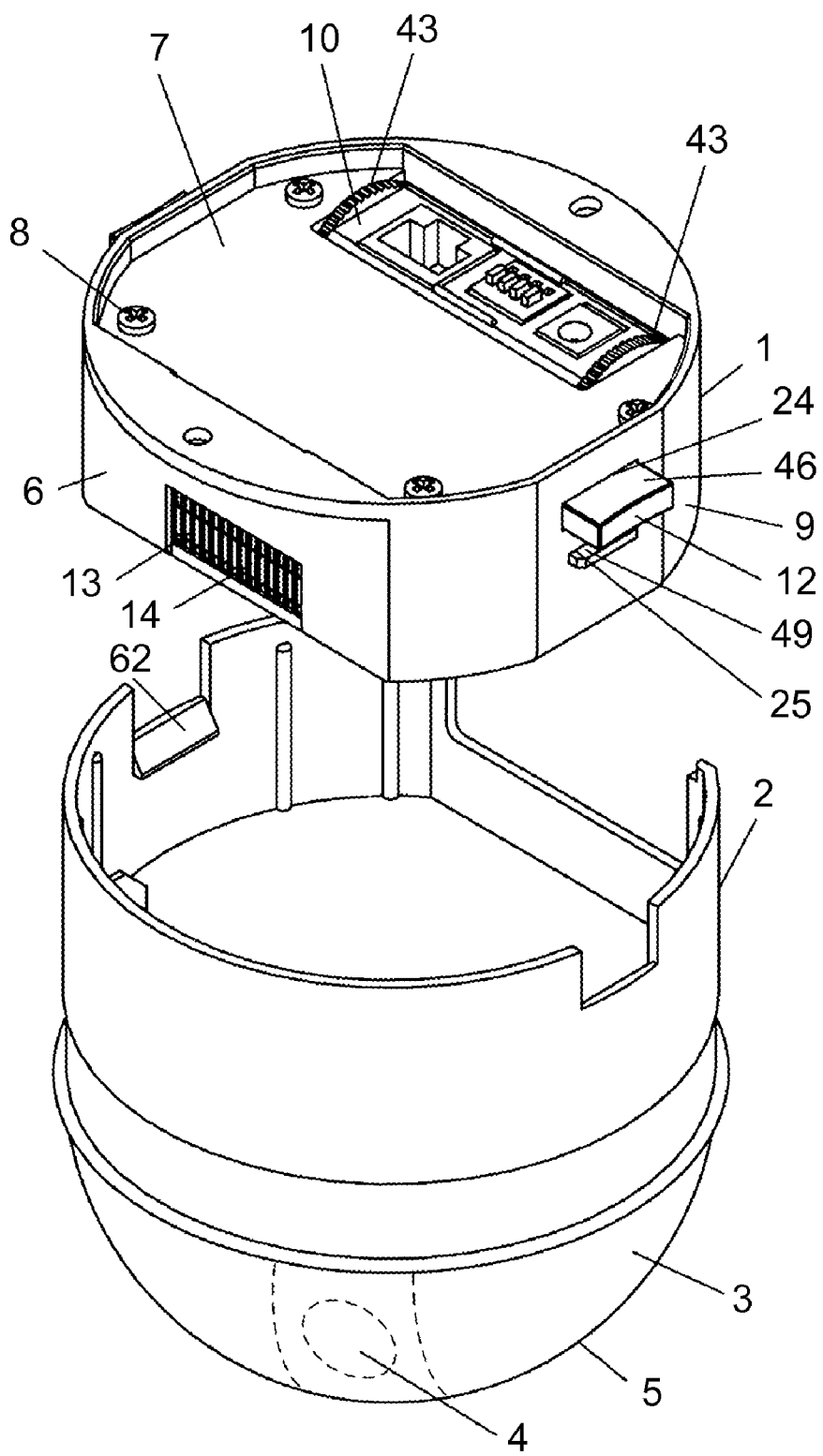
FIG. 1 is a perspective view showing how the functional unit is attached to the base unit of the wiring fixture in accordance with an exemplary embodiment of the present invention.

REFERENCE MARKS IN THE DRAWINGS 1 base unit
2 functional unit
4 surveillance camera
5 electric device
9 case of base unit 1
10 connecting body
11 connecting section
12 locking structure
13 contact-point section
14 contact-point unit
15 bottom of case 9
16 side of case 9
17 mounting section of case 9
20 lock-spring fixing section
22, 23 aperture
24, 25 hole
26 connecting-body holding structure
41 protrusion
42 dent
44 lock spring
45 lock plate
46 lock-release button
47 middle section of lock plate 45

48 first end of lock plate 45
49 second end of lock plate 45
58 case of functional unit 2
59 contact-point spring unit
60 bottom of case 58
61 side of case 58
62 locking claw
64 contact-point spring section
66 ceiling
67 hole
68 line

DETAILED DESCRIPTION OF THE PREFERRED EMBODIMENTS

The wiring fixture of the present invention has a base unit, which is to be mounted on a predetermined position, and a functional unit that is formed as a removable structure and is to be electrically connected to the base unit. The base unit has a connecting body having a connecting section for connecting a first line from a control section of an electric device. The connecting body is rotatably disposed to the base unit so that the connecting section not only faces in a mounting direction of the base unit but also faces in a direction different from the mounting direction of the base unit.

The structure above easily copes with a layout change, allowing the lines required for connection to be led through the hole as it has been used before the layout change, with no need for drilling an additional hole at a newly mounting position.

According to the wiring fixture of the present invention, the base unit has a connecting body, a first connecting section and a first contact-point section; on the other hand, the functional unit has a second connecting section that connects to the first connecting section and a second contact-point section that makes a contact with the first contact-point section. The structure above easily establishes mechanical and electrical connections between the base unit and the functional unit.

The wiring fixture of the present invention has a structure where a line from the connecting section is connected to the first contact-point section and a second line from an electric device is connected to the second contact-point section. The structure easily establishes electrical connections between the base unit and the functional unit.

According to the wiring fixture of the present invention, the connecting body is rotatably disposed to the base unit so that the connecting section faces in a different direction substantially perpendicular to the mounting direction of the base unit. The structure above easily copes with a layout change, allowing the lines required for connection to be led through the hole as it has been used before the layout change, with no need for drilling an additional hole at a newly mounting position.

According to the wiring fixture of the present invention, the base unit has a case. A pair of locking structures, each of which has a lock plate, is oppositely disposed. Each lock plate is bent in the middle so as to have both ends extending in a same direction from the middle. Each of the lock plates is urged toward outside the base unit and the both ends of each lock plate are exposed to the outside from the side surface of the case of the base unit. The functional unit contains a case having an insertion opening through which the case of the base unit is inserted. An engagement section is formed inside the side surface of the case of the functional unit so as to correspond to a first end, which is the one disposed farther from the mounting position than the other end of the both ends. The engagement section has a substantially triangular shape in section with the base of the triangle disposed on the side opposite to the insertion opening. Attaching the case of the base unit to the case of the functional unit and then fitting the first end with the engagement section completes the combined structure of the base unit and the functional unit. The structure above establishes mechanical connection with ease and reliability.

According to the wiring fixture of the present invention, pushing force of the lock plate to a second end, which is the one closer to the mounting position than the other end of the both ends, allows the first end to go backward in engagement with the second end, by which the first end is removed from the engagement section. The structure above allows the functional unit to be removed from the base unit with ease and reliability.

The surveillance camera device of the present invention has a structure where a surveillance camera is disposed to the functional unit of the wiring fixture. The structure above provides a surveillance camera device capable of coping with a layout change and allowing the lines required for connection to be led through the hole that has been used before the layout change, with no need for drilling an additional hole at a newly mounting position.

The present invention provides a wiring fixture and a surveillance camera device capable of coping with a layout change and offering easy wiring between the base unit and lines led through the ceiling and a wall, even if a need for changing layout arises.

(EXEMPLARY EMBODIMENT)

An exemplary embodiment of the present invention is described hereinafter with reference to the accompanying drawings.

In the embodiment, the description will be given on an example where the electric device connected to the functional unit is an IP (Internet Protocol) surveillance camera connected to a network, and the wiring fixture relays lines between the surveillance camera and the control section.

Figure 2:
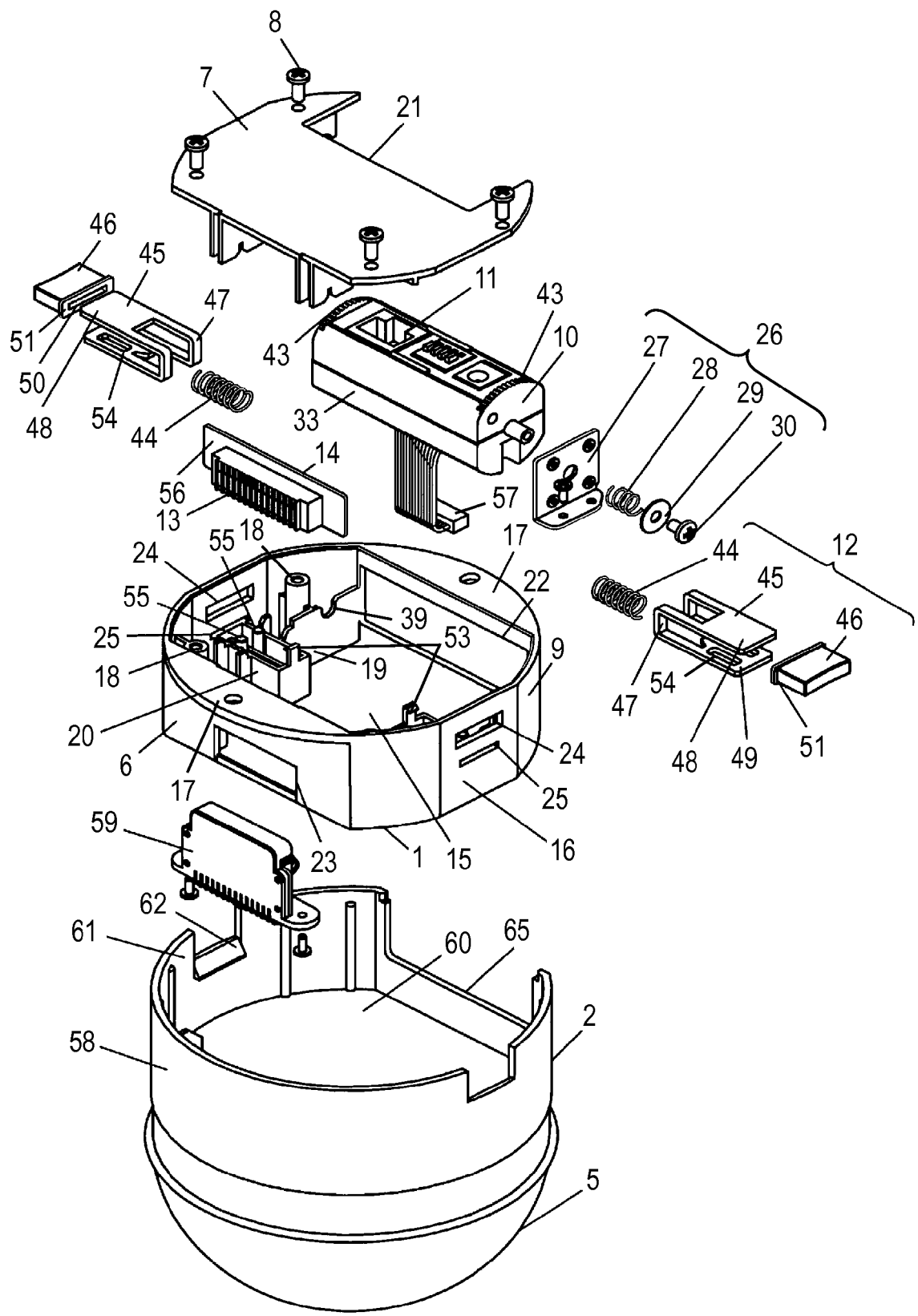
FIG. 2 is an exploded perspective view showing the wiring fixture in accordance with the exemplary embodiment.

FIG. 1 is an exploded perspective view showing how the functional unit is attached to the base unit of the wiring fixture of the exemplary embodiment. FIG. 2 is an exploded perspective view showing the wiring fixture of the exemplary embodiment.

As is shown in FIG. 1, the wiring fixture has base unit 1, which is to be mounted on the ceiling or a wall, and functional unit 2 that is removably attached to base unit 1. Base unit 1 and functional unit 2 establish mechanical and electrical connections. Functional unit 2 contains electric device 5 having surveillance camera 4 inside domed cover 3. Base unit 1, functional unit 2 and electric device 5 form the surveillance camera device. Surveillance camera 4 not only receives control signals for panning or tilting but also receives motor-driving power supply from the control section (not shown). Video signals of videos taken by surveillance camera 4 are transmitted to the control section. In most cases, the aforementioned wiring fixture is mounted on the ceiling. Hereinafter, the description will be given on an understanding that the wiring fixture is mounted on the ceiling and base unit 1 is situated in the upper section and functional unit 2 is in the lower section when the two units are connected.

As is shown in FIG. 1, base unit 1 contains case 9 having case body 6 on which lid plate 7 is screwed with screws 8, connecting body 10 rotatably disposed to case 9, connecting-body holding structure 26 (see FIG. 2) for rotatably holding connecting body 10, a pair of locking structures 12 as a first connecting section for attaching/detaching functional unit 2, and contact-point unit 14 as a first contact-point unit that is accommodated in case 9 with contact-point section 13 exposed outside.

As is shown in FIG. 2, case 9 of base unit 1 has case body 6 and lid plate 7 that partially covers the opening of case body 6. Case body 6 contains bottom 15, side 16 adjoining bottom 15, and mounting section 17 adjoining side 16 for mounting base unit 1 on the ceiling. On bottom 15 of case body 6, four bosses 18 (some of which are shown in FIG. 2) that extend upward, groove-equipped upright wall 19 that is integrally formed with bottom 15, and lock-spring fixing section 20. Lid plate 7 is screwed on bosses 18 by screws 8. Case 9 shown in FIG. 1 is thus structured. Lid plate 7 has notch 21 through which connecting section 11 of connecting body 10 is exposed outside case 9, and connecting section 11 faces toward the ceiling (see FIG. 1). In addition, side 16 of case body 6 has aperture 22 through which connecting section 11 faces a wall, that is, connecting section 11 faces in a direction substantially perpendicular to the ceiling when connecting body 10 is rotated. Side 16 also has aperture 23 for the contact-point unit. Side 16 of case body 6 has oppositely disposed two holes 24 and 25 through which a part of locking structures 12 goes outside.

Connecting-body holding structure 26 has, as is shown in FIG. 2, angle 27 with an L-shape in section, compression spring 28, washer 29 and screw 30. Angle 27 is screwed on bottom 15 of case body 6.

Figure 3:
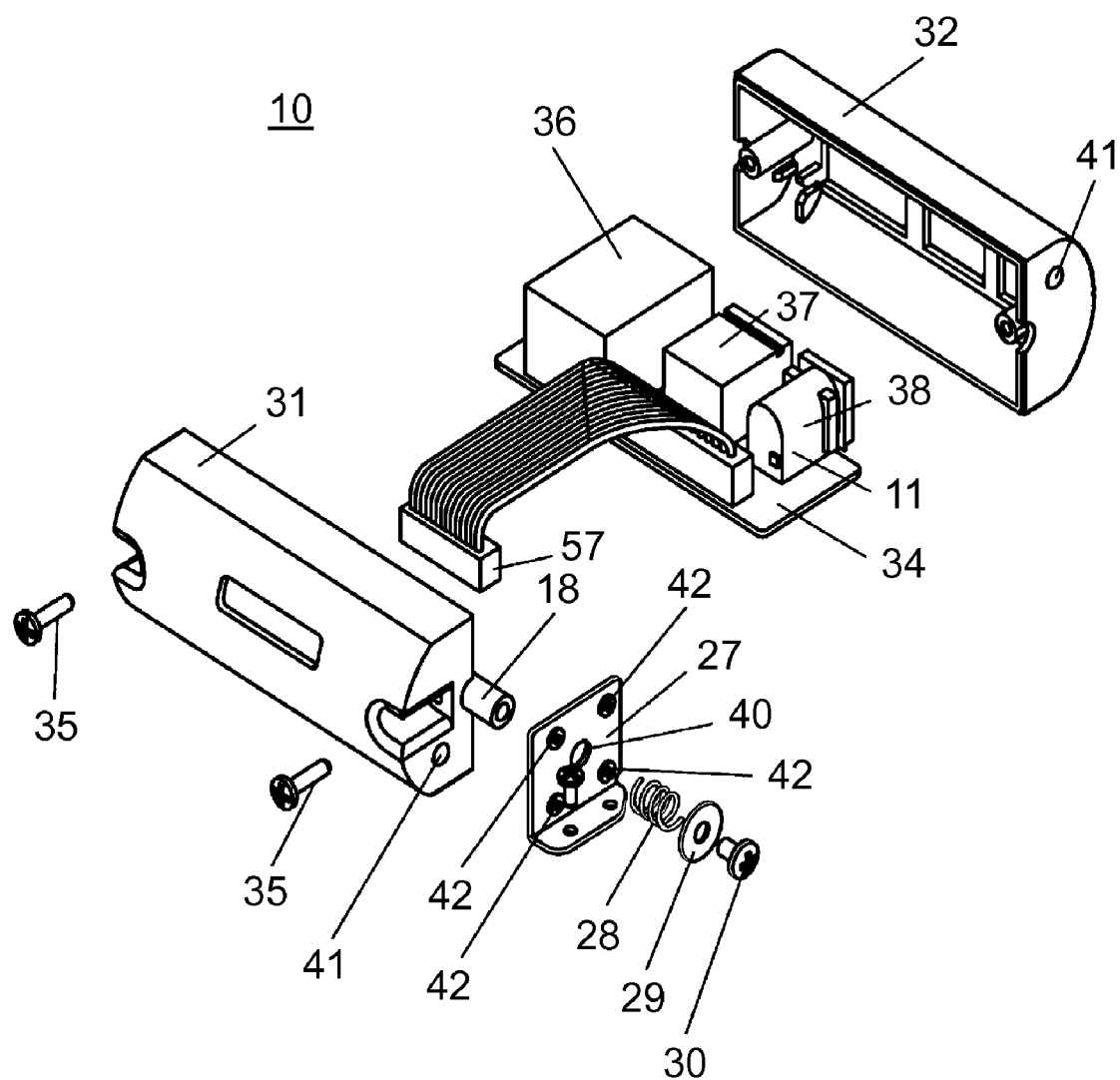
FIG. 3 is an exploded perspective view showing the connecting body of the wiring fixture in accordance with the exemplary embodiment.

As is shown in FIG. 3, connecting body 10 has connecting-body case 33 formed of first case 31 and second case 32, which are screwed with screws 35 (see FIG. 2). Connecting-body case 33 accommodates circuit board 34 and connecting section 11 that is formed of three connectors mounted on circuit board 34. The connectors are modular jack connector 36 for connecting a data transmission line, spring clamp connector 37 used for data input/output of a temperature sensor, and connector 38 for connecting a power supply line.

Figure 4:
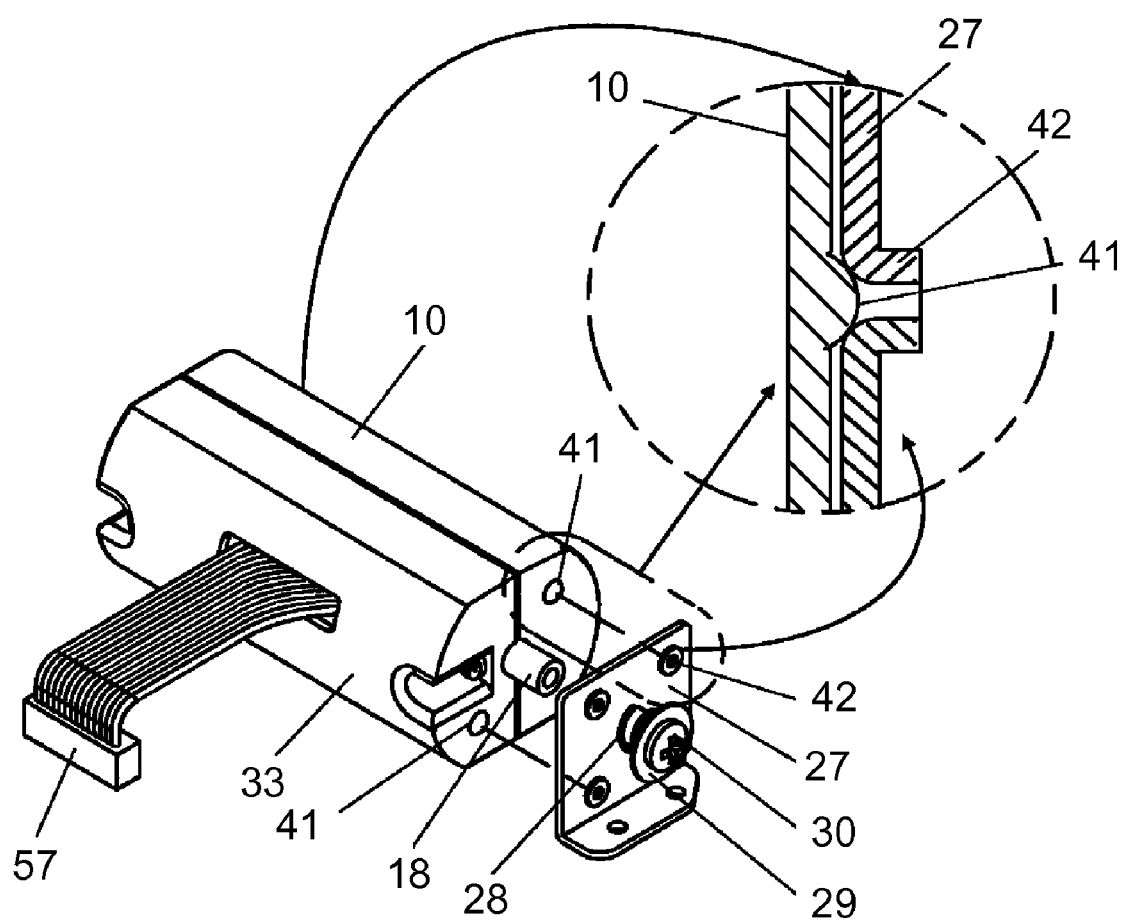
FIG. 4 shows the structure of the connecting body of the wiring fixture in accordance with the exemplary embodiment.

On the both ends of first case 31, as is shown in FIGS. 2 and 3, hollow bosses 18 are formed in the lengthwise direction (one of them is shown in FIGS. 2 and 3). The boss omitted from the figures is inserted in groove 39 (see FIG. 2) of wall 19 formed in case 9. The other one, which is shown in the figures, is inserted in hole 40 of angle 27. The diameter of hole 40 of angle 27 is slightly larger than the outer diameter of the boss. Protrusion 41 is formed at a position adjacent to angle 27 on each side surface of first case 31 and second case 32. On the other hand, four dents 42 for accepting protrusion 41 are concentrically formed on angle 27. The distance between the center of hole 40 of angle 27 and the center of each of dents 42 equals to the distance between the center of boss 18 and the center of protrusion 41. FIG. 4 is an enlarged view showing the state where protrusion 41 is fitted in dent 42.

Figure 6:
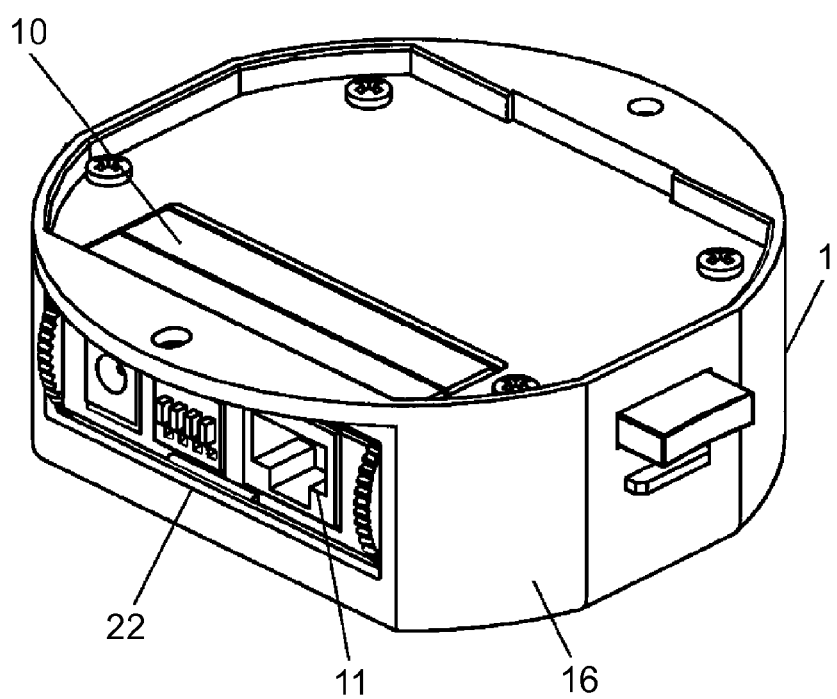
FIG. 6 is a perspective view showing the base unit of the wiring fixture in accordance with the exemplary embodiment.

Compression spring 28 and washer 29 are fitted on a portion of boss 18 protruded through hole 40 of angle 27. Screwing down screw 30 firmly into boss 18 via washer 29 allows connecting body 10 to be rotatably attached to case 9. Specifically, as screw 30 is screwed down, compression spring 28 is compressed between angle 27 and washer 29. Under the condition, connecting-body case 33 is pulled toward angle 27 by restoring force of compression spring 28, which allows protrusion 41 to abut against angle 27. In this way, connecting body 10 is rotatably attached to base unit 1. Connecting body 10 can be rotated about 90° by the fingers. That is, the finger operation allows connecting section 11 to face either of the following directions: the direction toward the ceiling on which base unit 1 is mounted, or the direction toward a wall that is rotated about 90°, as shown in FIG. 6, from the direction of the ceiling. With the structure above, according to the mounting condition of base unit 1, the facing direction of connecting section 11 can be easily chosen between the ceiling-side and the wall-side.

FIGS. 1 and 2 show non-slip members 43 formed on the both ends of first case 31. Members 43 are formed in the general shape of an arc with a serrated edge, allowing connecting body 10 to be easily rotated by the fingers.

Locking structure 12 is, as is shown in FIG. 2, formed of lock spring 44, lock plate 45 and lock-release button 46. Lock plate 45 has bent middle section 47, second end 48 and first end 49. The two ends extend in the same direction from middle section 47. Lock-release button 46 is fixed to second end 48—which is the end situated closer to the ceiling, i.e., the mounting position—in a manner that second end 48 is inserted into groove 50 of lock-release button 46. Lock-release button 46 protrudes outside through hole 24 of case body 6 (see FIG. 1). Stopper 51 is formed on the periphery of groove 50 of lock-release button 46. First end 49, which is the farther end, protrudes outside through hole 25 of case body 6 (see FIG. 1).

Figure 7:
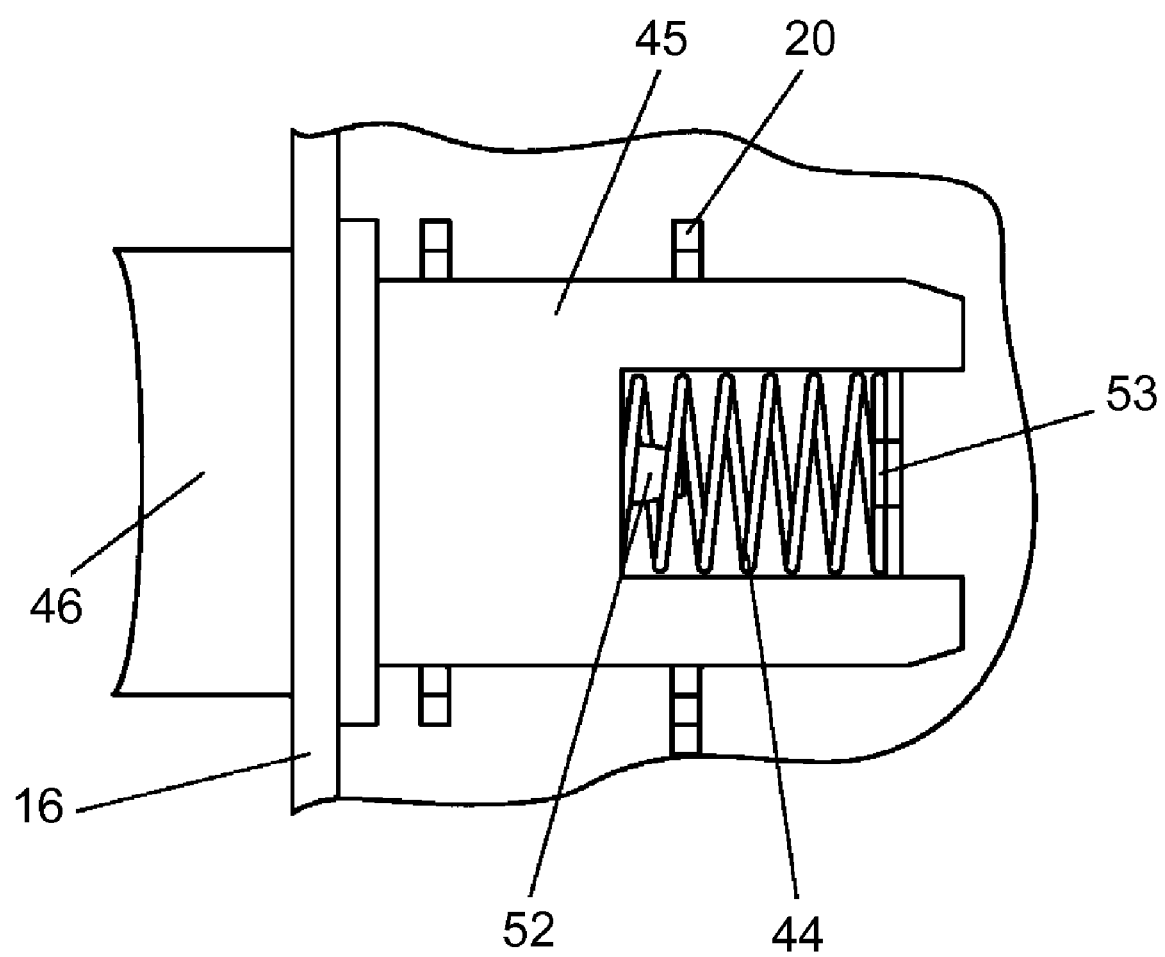
FIG. 7 is a plan view, partially enlarged, of the base unit of the wiring fixture in accordance with an exemplary embodiment.

As is shown in FIG. 7, lock spring 44 is inserted in lock-spring fitting section 20. One end of lock spring 44 is inserted in lock-spring mounting section 52, and the other end is fitted into lock-spring hook 53. Lock spring 44 has a length sufficiently longer than the distance between the front end of lock-spring mounting section 52 and the rear end of lock-spring hook 53. Therefore, lock plate 45 is normally urged toward the outside of side 16 of case body 6.

Next will be described how to assemble locking structure 12 into case 9. In FIG. 2, lock plate 45 is mounted on lock-spring fitting section 20, and each of two guide pins 55 disposed inside lock-spring fitting section 20 is inserted into each of two holes 54 formed in second end 49 of lock plate 45. Under the condition, applying a force to lock plate 45 toward side 16 of case body 6 allows lock plate 45 to slide on lock-spring fitting section 20, taking a limited route guided by guide pins 55 in holes 54. Further application of sliding force to lock plate 45 allows lock-release button 46, which is fixed to first end 48, to protrude outside through hole 24; at the same time, allows second end 49 to protrude outside through hole 25. As a result, stopper 51 of lock-release button 46 abuts against the inner surface of side 16 of case body 6.

Under the condition above, as shown in FIG. 7, one end of lock spring 44 is inserted in lock-spring mounting section 52 that is formed on lock plate 45, and the other end is fitted into lock-spring hook 53 formed on lock-spring fitting section 20. Through the engagement above, lock spring 44 is mounted on lock-spring fitting section 20. Lock spring 44 normally urges lock plate 45 in the outward direction of side 16.

When lock plate 45 is urged in the outward direction of side 16, as described above, second end 49 protrudes outside through hole 25 of side 16. On the other hand, when lock-release button 46 is pushed in the inward direction of side 16, second end 49 comes inside, moving from the outside of side 16 through hole 25.

Contact-point unit 14, as shown in FIG. 2, has contact-point section 13, circuit board 56 and a receptacle (not shown) for connecting plug 57 led from connecting section 11. Contact-point unit 14 is fixed on bottom 15 of case body 6, with contact-point section 13 exposed outside through aperture 23 (see FIG. 1). Connecting plug 57 led from connecting section 11 to the receptacle establishes electrical connections between contact-point section 13 and a first line from the control section of surveillance camera 4.

Figure 8:
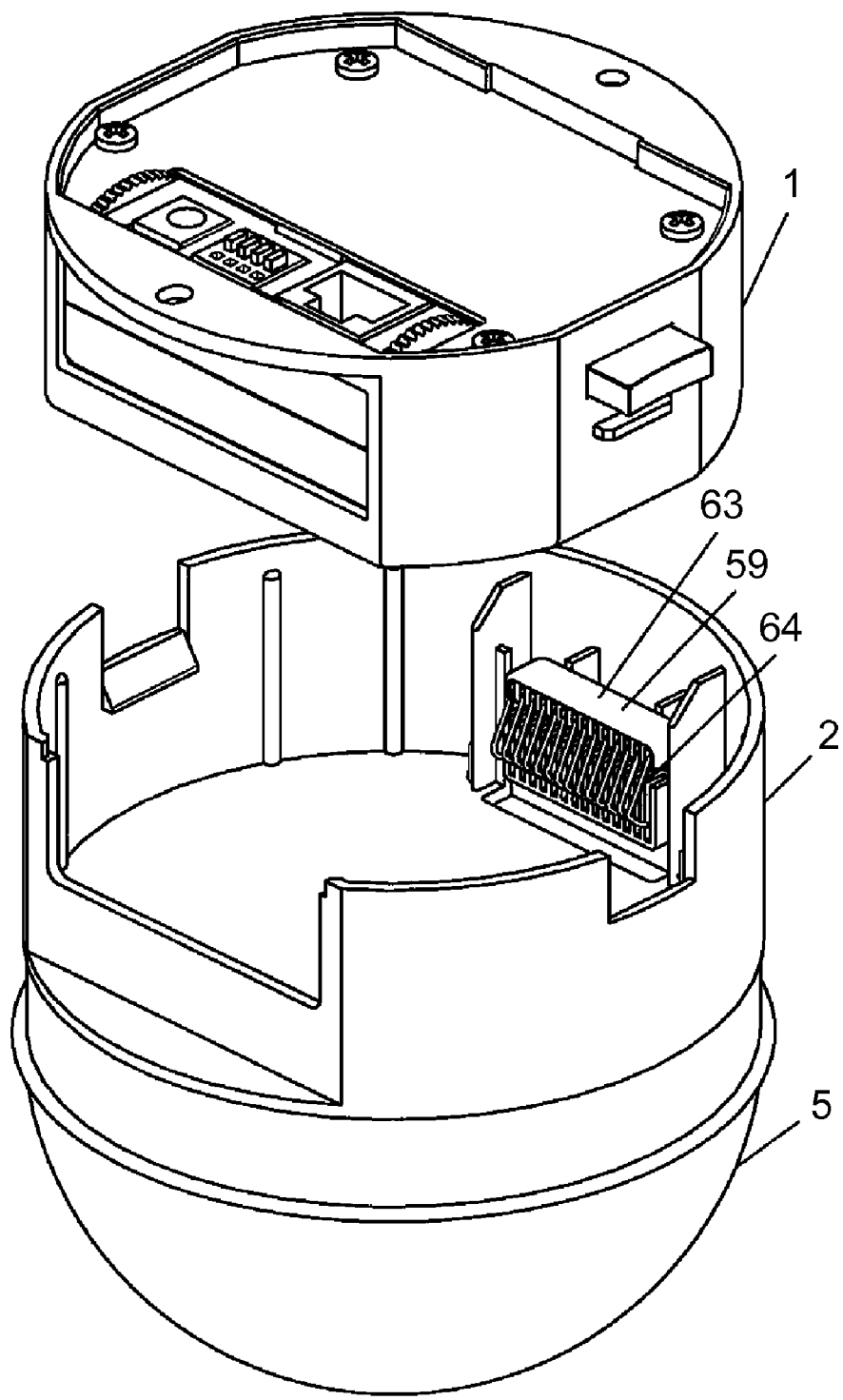
FIG. 8 is a perspective view showing how the functional unit is attached to the base unit of the wiring fixture in accordance with the exemplary embodiment.

As described earlier, functional unit 2 of FIG. 1 contains electric device 6 having surveillance camera 4 inside domed cover 3. Functional unit 2, as is shown in FIG. 2, has case 58 of functional unit 2 and contact-point spring unit 59. Case 58 is formed of bottom 60 and side 61 adjoining bottom 60. Side 61 has a base-unit insertion opening (through which case 9 of base unit 1 is inserted). In addition, side 61 has notch 65. When base unit 1 is combined with functional unit 2, connecting section 11 is exposed outside from notch 65 through aperture 22. Besides, locking claws 62 as a second connecting section are oppositely disposed on side 61. Each of locking claws 62 has a substantially triangular shape in section with the base of the triangle disposed on the side opposite to the insertion opening. As is shown in FIG. 8, contact-point spring unit 59 has frame 63 with a plurality of grooves and contact-point section 64 fixed to the grooves. Contact-point section 64 is formed of an elastic metal piece of substantially V-shape and serves as a second contact-point section.

Next will be described the workings of the wiring fixture structured above. The description here is given on an example where the wiring fixture is mounted on the ceiling.

Prior to mounting, connecting section 11 of connecting body 10, which is rotatably disposed on a base unit 1, is set so as to face the ceiling. After connecting each line led through the ceiling to connecting section 11 of connecting body 10 that is rotatably disposed on base unit 1, mounting section 17 of base unit 1 is screwed down on the ceiling.

Figure 9:
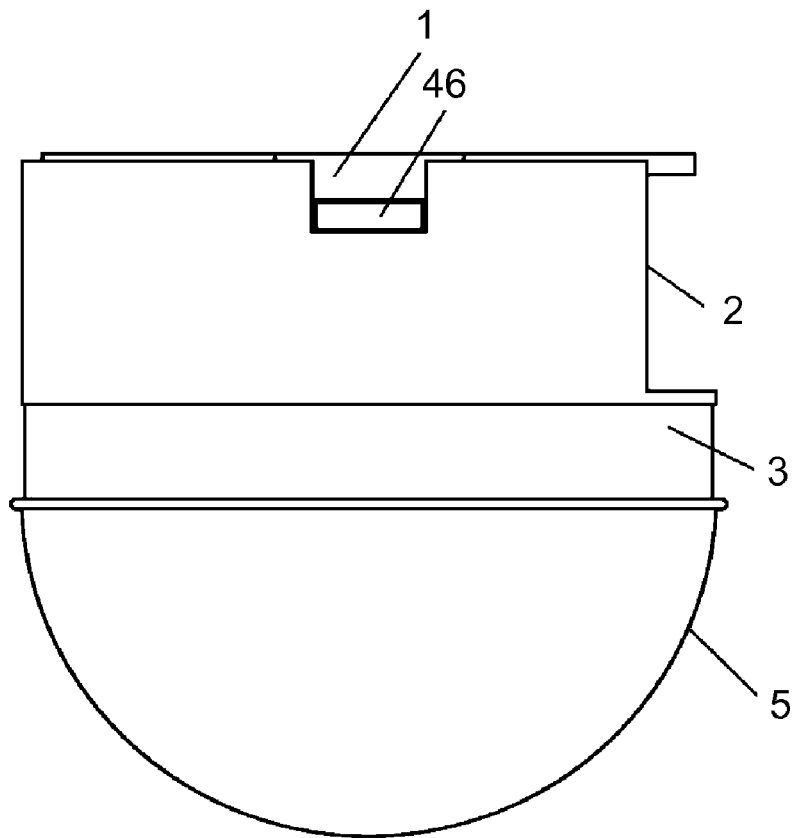
FIG. 9 is a side view showing the wiring fixture in accordance with the exemplary embodiment.

Next, functional unit 2 is held, with the base-unit insertion opening directed upward, and situated under base unit 1 in a manner that each of locking claws 62 of functional unit 2 is placed under first end 48 and second end 49 of a pair of lock plates 45 that protrudes outside case 9 of base unit 1. Pushing functional unit 2 upward against base unit 1 allows base unit 1 to fit inside functional unit 2. Further application of the upward pushing force invites a series of engagement as follows:

second end 49 of lock plate 45 abuts on locking claw 62 of functional unit 2;
second end 49 is guided by the inclined surface of locking claw 62 toward inside;
after the lower part of locking claw 62 goes over the upper part of second end 49, restoring force of lock spring 44 allows second end 49 to return its original state, and the upper part of second end 49 fits under the lower part of locking claw 62.
Having the engagement above, functional unit 2 is securely attached to base unit 1, as shown in FIG. 9.

As described above, mechanical connection of functional unit 2 and base unit 1 is easily established by applying an upward-pushing force to functional unit 2.

On the other hand, operating two lock-release buttons 46 allows functional unit 2 to be detached from base unit 1. Specifically, pushing two lock-release buttons 46 toward inside base unit 1 allows second end 49 to come off locking claw 62, so that functional unit 2 is detached from base unit 1.

As described above, functional unit 2 can be easily removed from base unit 1. At that time, functional unit 2 is detached from base unit 1 only when the two lock-release buttons 46 are pushed at the same time. If one of the lock-release buttons is unintentionally pushed, functional unit 2 does not come off. That is, the structure prevents an accidental fall of functional unit 2, offering a high level of safety.

Next will be described electrical connections between base unit 1 and functional unit 2.

The electrical connections between base unit 1 and functional unit 2 are established by connection of contact-point section 13 of base unit 1 (see FIG. 1) and contact-point spring 64 of functional unit 2 (see FIG. 8). The description thereof will be given below.

In the state where functional unit 2 and base unit 1 have mechanical connections, contact-point spring 64 of functional unit 2 that has a connection to a second line from surveillance camera 4 is connected to contact-point section 13 of base unit 1. That is, the wiring fixture of the present invention connects between surveillance camera 4 and the control section. Receiving signals from the control section via the wiring fixture, surveillance camera 4 carries out panning and tilting.

Next will be described a case where the wiring fixture has to be moved to a different position due to layout change.

Functional unit 2 is removed from base unit 1 by pushing lock-release buttons 46 of base unit 1, and then base unit 1 is removed from the ceiling by loosening the screws at mounting section 17 of base unit 1.

Figure 5:
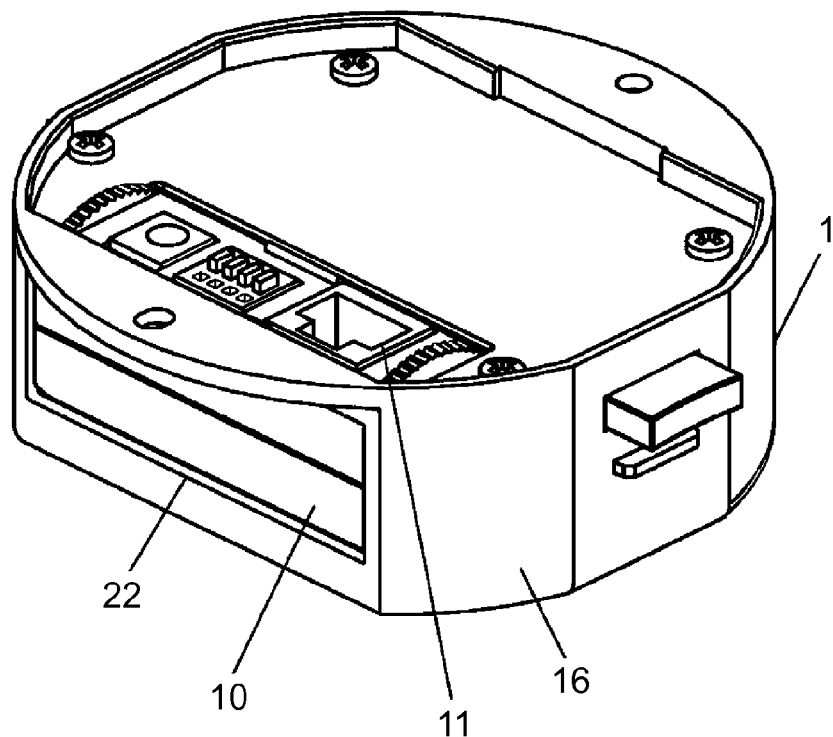
FIG. 5 is a perspective view showing the base unit of the wiring fixture in accordance with the exemplary embodiment.
Figure 10:
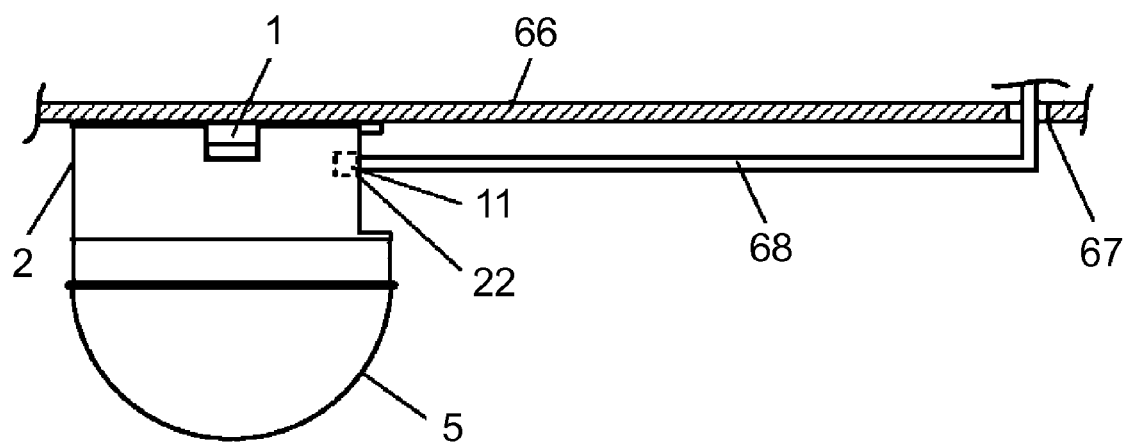
FIG. 10 shows a state where the wiring fixture is moved to a different position in accordance with the exemplary embodiment.

The procedure below is for moving base unit 1 mounted on the ceiling to a different position on the ceiling. In particular, if the rear side of the ceiling, which corresponds to a newly fixed position of the wiring fixture, is too narrow to handle wiring in the space, the structure of the present invention can cope with the difficulty:

rotating connecting body 10 about 90° from the state shown in FIG. 5 so that connecting section 11 is exposed outside aperture 22 of side 16, as shown in FIG. 6; and
routing line 68, which is led through hole 67 that has been used before changing layout, along the ceiling and connecting line 68 to connecting section 11 through aperture 22 of side 16, as shown in FIG. 10.

As another advantage, the aforementioned connection has no need for drilling an additional hole at a newly fixed position in the ceiling. This is efficient in simplifying the mounting procedure in layout change.

INDUSTRIAL APPLICABILITY

The structure of the present invention offers easy wiring between the base unit and lines led through the ceiling or a wall, even if a layout change arises. It is therefore useful not only for the wiring fixture that relays lines between an IP surveillance camera and the control section of the surveillance camera, but also for a surveillance camera device.

The invention claimed is:

1. A wiring fixture comprising:
a base unit to be mounted on a predetermined mounting position;
a functional unit removably disposed and electrically connected to the base unit; and
the base unit having a connecting body including a connecting section for connecting a first line from a control section of an electric device,
wherein, the connecting body is rotatably disposed to the base unit so that the connecting section not only faces in a mounting direction of the base unit but also faces in a direction different from the mounting direction of the base unit.

2. The wiring fixture of claim 1, wherein the base unit has the connecting body, a first connecting section and a first contact-point section, whereas the functional unit has a second connecting section that connects to the first connecting section and a second contact-point section that connects to the first contact-point section, the first connecting section is connected to the second connecting section and the first contact-point section is connected to the second contact-point section.

3. The wiring fixture of claim 2, wherein a line led from the connecting section is connected to the first contact-point section, and a second line led from the electric device is connected to the second contact-point section.

4. The wiring fixture of claim 1, wherein the connecting body is rotatably disposed to the base unit so that the connecting section faces in a different direction substantially perpendicular to the mounting direction of the base unit.

5. The wiring fixture of claim 1,
wherein,
the base unit has a case in which a pair of locking structures having a lock plate is oppositely disposed;
the lock plate is bent in a middle so as to have both ends extending in a same direction from the middle, the lock plate is urged toward outside the base unit and the both ends of the lock plate are exposed outside from a side surface of the case of the base unit;
the functional unit contains a case having an insertion opening through which the case of the base unit is inserted,
an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and
attaching the case of the base unit to the case of the functional unit and then fitting the first end with the engagement section completes connection of the base unit and the functional unit.

6. The wiring fixture of claim 5, wherein pushing force of the lock plate to a second end that is situated closer to the mounting position in the both ends allows the first end to go backward in engagement with the second end, by which the first end is removed from the engagement section.

7. A surveillance camera device comprising:
a wiring fixture including:
a base unit to be mounted on a predetermined mounting position;
a functional unit being removably disposed and electrically connected to the base unit; and
the base unit having a connecting body including a connecting section for connecting a first line from a control section of the surveillance camera; and
a surveillance camera disposed to the functional unit of the wiring fixture,
wherein, the connecting body is rotatably disposed to the base unit so that the connecting section not only faces in a mounting direction of the base unit but also faces in a direction different from the mounting direction of the base unit.

8. The surveillance camera device of claim 7, wherein the base unit has the connecting body, a first connecting section and a first contact-point section, whereas the functional unit has a second connecting section that connects to the first connecting section and a second contact-point section that connects to the first contact-point section, the first connecting section is connected to the second connecting section and the first contact-point section is connected to the second contact-point section.

9. The surveillance camera device of claim 8, wherein a line led from the connecting section is connected to the first contact-point section, and a second line led from the surveillance camera is connected to the second contact-point section.

10. The surveillance camera device of claim 7, wherein the connecting body is rotatably disposed to the base unit so that the connecting section faces in a different direction substantially perpendicular to the mounting direction of the base unit.

11. The surveillance camera device of claim 7,
wherein,
the base unit has a case in which a pair of locking structures having a lock plate is oppositely disposed;
the lock plate is bent in a middle so as to have both ends extending in a same direction from the middle, the lock plate is urged toward outside the base unit and the both ends of the lock plate are exposed outside from a side surface of the case of the base unit;
the functional unit contains a case having an insertion opening through which the case of the base unit is inserted,
an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and
attaching the case of the base unit to the case of the functional unit and then fitting the first end with the engagement section completes connection of the base unit and the functional unit.

12. The surveillance camera device of claim 11, wherein pushing force of the lock plate to a second end, which is situated closer to the mounting position in the both ends, allows the first end to go backward in engagement with the second end, by which the first end is removed from the engagement section.

13. The wiring fixture of claim 2,
wherein,
the base unit has a case in which a pair of locking structures having a lock plate is oppositely disposed;
the lock plate is bent in a middle so as to have both ends extending in a same direction from the middle, the lock plate is urged toward outside the base unit and the both ends of the lock plate are exposed outside from a side surface of the case of the base unit;
the functional unit contains a case having an insertion opening through which the case of the base unit is inserted,
an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and
attaching the case of the base unit to the case of the functional unit and then fitting the first end with the engagement section completes connection of the base unit and the functional unit.

14. The wiring fixture of claim 3,
wherein,
the base unit has a case in which a pair of locking structures having a lock plate is oppositely disposed;
the lock plate is bent in a middle so as to have both ends extending in a same direction from the middle, the lock plate is urged toward outside the base unit and the both ends of the lock plate are exposed outside from a side surface of the case of the base unit;
the functional unit contains a case having an insertion opening through which the case of the base unit is inserted,
an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and attaching the case of the base unit to the case of the functional unit and then fitting the first end with the engagement section completes connection of the base unit and the functional unit.

15. The surveillance camera device of claim 8, wherein, the base unit has a case in which a pair of locking structures having a lock plate is oppositely disposed;

the lock plate is bent in a middle so as to have both ends extending in a same direction from the middle, the lock plate is urged toward outside the base unit and the both ends of the lock plate are exposed outside from a side surface of the case of the base unit;

the functional unit contains a case having an insertion opening through which the case of the base unit is inserted, an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and attaching the case of the base unit to the case of the functional unit and then fitting the first end with the engagement section completes connection of the base unit and the functional unit.

16. The surveillance camera device of claim 9, wherein, the base unit has a case in which a pair of locking structures having a lock plate is oppositely disposed;

the lock plate is bent in a middle so as to have both ends extending in a same direction from the middle, the lock plate is urged toward outside the base unit and the both ends of the lock plate are exposed outside from a side surface of the case of the base unit;

the functional unit contains a case having an insertion opening through which the case of the base unit is inserted, an engagement section is formed inside a side surface of the case of the functional unit so as to correspond to a first end that is situated farther from the mounting position in the both ends, the engagement section has a substantially triangular shape in section with a base of the triangle disposed on a side opposite to the insertion opening; and attaching the case of the base unit to the case of the functional unit and then fitting the first end with the engagement section completes connection of the base unit and the functional unit.

\* \* \* \* \*